United States Patent Office

3,099,642
Patented July 30, 1963

3,099,642
RUBBER-LIKE POLYURETHANES AND STORAGE STABLE INTERMEDIATES FOR PRODUCING THE SAME
Hans Holtschmidt, Cologne-Stammheim, and Karl E. Müller, Leverkusen-Bayerwerk, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 26, 1954, Ser. No. 471,526
Claims priority, application Germany Nov. 30, 1953
6 Claims. (Cl. 260—75)

This invention relates to cross-linked plastics of high molecular weight, intermediates and compositions for use in the production of these products and a process of producing same.

An object of the invention is to provide novel intermediates for use in the production of cross-linked plastics of high molecular weight.

Another object of the invention is to provide novel compositions of matter which are stable on storage and therefore are eminently suitable for use in the commercial production of cross-linked plastics of high molecular weight.

An additional object of the invention is to provide a process of preparing the above products and of converting the latter into cross-linked plastics of high molecular weight.

Other objects and advantages will become apparent to those skilled in the art as the description of the invention proceeds.

It is broadly old in the art to produce cross-linked plastics of high molecular weight by reacting polyesters containing isocyanate groups with diamines (see German Patent 838,826).

For example, one process for producing these plastics involves reacting polyesters containing isocyanate groups with an insufficient amount of a diamine to react with all of the free isocyanate groups.

Another method of preparing these products comprises reacting polyesters containing isocyanate groups with a diamine in an amount in excess of that required to react with the isocyanate groups and then reacting at a later stage of the process the resulting products with more diisocyanate. One disadvantage of this process is that, when the intermediate products are not shaped and cross-linked, but are mixed with the diisocyanate required for the final cross-linking, these intermediate products are only stable in storage for a very short time (usually less than 1 hour) since the free NCO groups react with the amino groups at relatively low temperatures. Consequently, the polyesters are partially cross-linked while they are being mixed on the rolls in the cold state, or while they are being shaped in a worm press or extrusion nozzle. The same effect is observed to a somewhat lesser degree with polyester isocyanates where diols are used as cross-linking agents. If attempts are made to counteract this rapid cross-linking action by substantially reducing the tendency of the diisocyanate and diamine to react, i.e. by starting with very weakly basic diamines, such as 4,4'-diamino-diphenyl sulphone, benzidine sulphone or 2-nitro-1,4-phenylene diamine, or with slowly reacting aliphatic and cycloaliphatic diisocyanates such as for example 1,6-hexane diisocyanate or hexahydro-p-phenylene diisocyanate, cellular molded elements having poor physical properties are obtained, which are consequently unsuitable for commercial use.

We have now found that the above described disadvantages can be avoided by preparing cross-linked plastics of high molecular weight by the novel process hereinafter described. In accordance with this process, a stable polymeric material is obtained by reacting a polyester with a diisocyanate in an amount sufficient to yield a product containing free isocyanate groups and then reacting this product with a predominantly aromatic diamine in an amount such that free amino groups are present in the resulting reaction product. This product is mixed with a diisocyanate containing a uretidinedione group to form a composition that is quite stable on storage at room temperature and moderately elevated temperature. The composition thus obtained may be immediately or subsequently heated at any desired time to a temperature above 80° C. to form cross-linked plastics of high molecular weight.

Broadly stated, the present invention provides an intermediate for use in the production of cross-linked plastics and a process for producing same which comprises reacting a linear or substantially linear polyester with a diisocyanate to form a chain lengthened polyester containing an excess of free NCO groups and then reacting the resulting product with an amount of a predominantly aromatic amine such that free amino groups are present in the polyester at the end of the reaction. The product or intermediate thus obtained is a polyester containing urethane and free amino groups.

More specifically, the invention provides novel compositions of matter and a process for their production which comprises mixing or otherwise incorporating a diisocyanate containing a uretidinedione grouping:

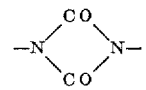

with the intermediate product described in the preceding paragraph. The compositions thus obtained comprise a polyester containing urethane and free amino groups and a diisocyanate containing a uretidinedione grouping; they are characterized by a high degree of stability at temperatures below 80° C.

Still more specifically, the invention provides cross-linked plastics of high molecular weight and a process for their preparation which comprises heating the above novel compositions of matter to a temperature above 80° C., preferably with simultaneous shaping.

Our invention is illustrated but not limited by the following examples:

*Example 1*

600 parts of an adipic acid-ethylene glycol polyester with hydroxyl number 56 and acid number 1, which has been dehydrated by heating in vacuo to 130° C., is mixed at this same temperature with 59 parts of 1,2,4-tolylene diisocyanate. The temperature rises to about 140° C. After cooling the resulting product to 100° C., 32.4 parts of 3,3'-dichlorobenzidine is added, which dissolves rapidly with thorough sitrring. The viscosity is thus greatly increased. The product is stirred for about 10 minutes and then is poured into a waxed metal shell and heated for 20 hours at 100° C. A readily soluble lengthened polyester of unlimited stability is obtained which is capable of being satisfactorily worked on a roller.

In order to produce a cross-linked highly elastic plastic, 6 parts of dimeric 1,2,4-toluylene diisocyanate is simultaneously or subsequently incorporated into 100 parts of the lengthened polyester by rolling on the roller; and the resulting intermediate composition is then formed into plates by pressing for one half an hour at 140° C.

The mechanical values of the pressed plates are as follows:

| | |
|---|---|
| Tearing strength_____kg./cm.$^2$__ | 321.9 |
| Breaking elongation_____percent__ | 655 |
| Loading at 300% elongation_____kg./cm.$^2$__ | 95 |
| Structure ring test_____kg. abs__ | 41.2 |
| Elasticity _____ | 44 |
| Resistance to scratching (fan test)_____kg./cm__ | 56 |
| Resistance to needle scratching_____kg./cm__ | 108 |

The mechanical values were determined after storing for 20 hours at 100° C.

The intermediate composition prepared as above described as capable of being extruded at temperatures higher than 80° C. to form tubes and outer covers, for example.

Example 2

600 parts of the dehydrated polyester specified in the preceding example is reacted with 54 parts of 1,2,4-toluylene diisocyanate in an analogous manner to Example 1. After cooling to 100° C., 20.6 parts of 1,5-naphthylene diamine is added. The viscosity increases very rapidly and the solid friable product obtained is heated for 20 hours at 100° C. The heated product is soluble in glycol monomethyl ether acetate and is capable of being rolled out satisfactorily to form a smooth sheet. 6 parts of dimeric 1,2,4-toluylene diisocyanate is incorporated by rolling into 100 parts of the product thus obtained and the resulting intermediate is then pressed for one half an hour at 140° C. The values obtained after heating to 100° C. for 20 hours are as follows:

| | |
|---|---|
| Tearing strength_____kg./cm.$^2$__ | 237 |
| Breaking elongation_____percent__ | 615 |
| Loading at 300% elongation_____kg./cm.$^2$__ | 82 |
| Structure ring test_____kg. abs__ | 34 |
| Elasticity _____ | 50 |
| Resistance to scratching (fan test)_____kg./cm__ | 56 |
| Resistance to needle scratching_____kg./cm__ | 104 |

Example 3

600 parts of the polyester described in Example 1 is reacted, by the method described in Example 1, with 55 parts of a technical isomeric mixture of 1,2,4- and 1,2,6-toluylene diisocyanate, and then 32.4 parts of 3,3'-dichlorobenzidine is added. To the product thus obtained, 9.5% by weight of dimeric 1,2,4-toluylene diisocyanate is introduced, and the resulting composition is cross-linked by heating. The mechanical properties of the cross-linked product are as follows:

| | |
|---|---|
| Tearing strength_____kg./cm.$^2$__ | 351 |
| Breaking elongation_____percent__ | 650 |
| Loading at 300% elongation_____kg./cm.$^2$__ | 82 |
| Structure ring test_____kg. abs__ | 34.6 |
| Elasticity _____ | 41 |
| Resistance to scratching (fan test)_____kg./cm__ | 58 |
| Resistance to needle scratching_____kg./cm__ | 100 |

Example 4

Following the procedure of Example 1, 600 parts of the adipic acid-ethylene glycol polyester is reacted with 55 parts of a mixture consisting of 1,2,4-toluylene diisocyanate and 1,2,6-toluylene diisocyanate (in the ratio of 70 to 30). Then 32.4 parts of 3,3'-dichlorobenzidine is added. The final cross-linking is carried out with 11.2%, based on the weight of the intermediate, of dimeric 1-ethoxybenzene-2,4-diisocyanate (M.P. 185° C.). Pressing is done at 170° C. The characteristics of the plastic thus produced are similar to those of the material described in Example 3.

Example 5

Following the procedure of Example 1, 600 parts of the adipic acid-ethylene glycol polyester is reacted with 55 parts of a mixture consisting of 1,2,4-toluylene diisocyanate and 1,2,6-toluylene diisocyanate (in the ratio of 70 to 30). Then 32.4 parts of 3,3'-dichlorobenzidine is added. The final cross-linking is carried out with a mixture consisting of 4.5% of dimeric 1,2,4-toluylene diisocyanate and 7.3% of 4,4'-diphenyl methane diisocyanate, based on the weight of the intermediate. Upon heating, the values of the plastic thus produced are similar to those of the material described in Example 2.

Example 6

600 parts of a succinic acid-propylene glycol-1,2 polyester with hydroxyl number 55 and acid number 0.8 is reacted with 49.7 parts of p-phenylene diisocyanate. After a few minutes the reaction product gets viscous. Now there is added at 130° C. 32.4 parts of 3,3'-dichlorobenzidine. The final cross-linking is carried out with 10% of dimeric 1,2,4-toluylene diisocyanate, based on the weight of the intermediate. Pressing is done at 150° C. The mechanical values of the pressed plastic are as follows:

| | |
|---|---|
| Tearing strength_____kg./cm.$^2$__ | 307.8 |
| Breaking elongation_____percent__ | 653 |
| Loading at 300% elongation_____kg./cm.$^2$__ | 82 |
| Structure ring test_____kg. abs__ | 33 |
| Elasticity _____ | 44 |
| Resistance to scratching (fan test)_____kg./cm__ | 56 |
| Resistance to needle scratching_____kg./cm__ | 104 |

Example 7

Following the procedure of Example 1, 600 parts of the adipic acid-ethylene glycol polyester is reacted with 78.5 parts of 4,4'-diphenyl methane diisocyanate. After 10 minutes there is added to the viscous product 32.4 parts of 3,3'-dichlorobenzidine. The final cross-linking is carried out with 10%, based on the weight of the intermediate, of dimeric 1,2,4-toluylene diisocyanate. Upon heating, the mechanical values of the plastic thus obtained are similar to those of the material described in Example 6.

The various operating conditions which may be employed in the practice of this invention will now be described in greater detail.

In the initial phase of the process of the instant invention linear or substantially linear polyesters are employed which are lengthened with a diisocyanate and reacted with an excess of a diamine. The materials used in the production of these intermediates are described immediately below.

Linear or substantially linear polyesters particularly suitable for use as starting materials in the production of the foregoing intermediates are those prepared from substantially saturated aliphatic components. Succinic acid, adipic acid, sebacic acid and thiodipropionic acid are examples of suitable acids; and ethylene glycol, butylene glycol and 1,2-propylene glycol are examples of suitable glycols. Instead of glycol, small quantities of other bifunctional reactants such as diamines and amino alcohols may incorporated by condensation. By using a small excess of glycol and by heating for a sufficiently long time to 100°–250° C., polyesters can be obtained having an acid number of practically zero. The hydroxyl number is desirably held between 20 and 80 and preferably between 40 and 60. This corresponds to a percentage of 0.6% to 2.4%, and 1.2% to 1.8%, respectively.

Before the reaction with the diisocyanates takes place, it is necessary to free the polyesters prepared in this manner from any moisture which may adhere under the above conditions. This is effected by heating the polyesters to 100°–150° C. in vacuo or by passing inert gases therethrough at the same temperature.

The diisocyanates used in the first phase of the process to lengthen the chain of the polyester, and to effect subsequent further lengthening with the diamine, are preferably aromatic diisocyanates such as toluylene diisocyanate, p-phenylene diisocyanate, 4,4'-diphenyl methane diisocyanate, 1,5-naphthylene diisocyanate, dianisidine diisocyanate and benzidine diisocyanate.

The amount of free NCO groups present in the isocyanate polyesters during the reaction with the diamine is important in promoting the linear structure of the stable intermediate products. When aliphatic diisocyanates are used, it is essential that there should not be more than 0.3% free NCO groups present in excess; and when aromatic diisocyanates are used, the excess should not be more than 0.15% to a maximum of 0.25% free NCO groups since with a larger excess cross-linking reactions may be initiated during the subsequent heating.

The diamines added in excess to the polyester containing isocyanate groups are preferably those which are not too strongly basic and consequently can act aminolytically on the polyesters. Particularly suitable diamines are aromatic diamines, such as 3,3'-dichlorobenzidine, chlorophenylene diamines, benzidine, 1,5-naphthylene diamine and 4,4'-diamino-diphenyl methane.

The amount of diamine used in the reaction with isocyanate polyestesr should be substantially the same as in the casting process described in German Patent 838,826, which means that the diamine is used in an amount such that the lengthened polyester contains $NH_2$ in an amount ranging from 0.6 to 0.8% by weight.

The temperature at which the reaction between the diisocyanate polyester and the diamine takes place is between 80° C. and 130° C. The intermediate products obtained by this reaction, and particularly those obtained by heating for twenty hours at 100° C. are characterized by substantial stability on storage. Moreover these products are readily soluble in solvents such as glycol monomethyl ether acetate and can be worked satisfactorily on rolls without the use of auxiliary or roll releasing agents.

The second phase of the process is carried out by incorporating a diisocyanate having a uretidinedione ring with the intermediate products on the rolls in such an amount that the free NCO groups of the diisocyanate are either equivalent to, or not sufficient to react with, the free amino groups. However, the uretidinedione-diisocyanate is incorporated in the intermediate products in an amount sufficient to provide an excess of diisocyanate when the uretidinedione ring opens on being heated. In general, the uretidinedione-diisocyanate is used in an amount of 5 to 15%, base on the weight of the intermediate product.

After a short time, the mixture of the intermediate products and uretidinedione-diisocyanate has no free NCO groups since these groups react completely in the cold on the rolls with the large excess of diamine present in the chain lengthened polyester. For this reason, at room or moderately elevated temperatures, the chain lengthened polyethers have unlimited stability which is a substantial advantage from a technical point of view. It is only at some desired subsequent time when these products are heated to a temperature higher than 80° C., preferably with simultaneous shaping, that the uretidinedione ring opens and the cross-linking process takes place with the formation of high quality elastic materials.

Dimeric 1,2,4-toluylene diisocyanate having the formula:

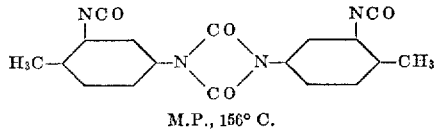

M.P., 156° C.

is a diisocyanate which contains an uretidinedione grouping. Examples of other diisocyanates which contain this grouping are: dimeric 1-chloro-2,4-phenylene diisocyanate, M.P. 177° C.; dimeric 1-ethyl-2,4-phenylene diisocyanate, M.P. 148° C.; and dimeric 1-ethoxy-2,4-phenylene diisocyanate, M.P. 185° C. As is apparent from these examples, an aromatic dimeric diisocyanate is one formed by addition of only two mols of a monomeric aromatic diisocyanate through —NCO groups with the formation of a uretidinedione ring. These dimeric diisocyanates are readily prepared in good yield by reacting tertiary bases with the corresponding monomeric diisocyanates.

The cross-linking of the polyester in the hot state may take place either by thermal splitting of the uretidinedione ring into two monomeric diisocyanates, thus giving the necessary excess of dissocyanate, or by the uretidinedione ring opening at one side to form a tri-substituted biuret. Since the speed with which the uretidinedione ring splits is dependent upon the basic nature of the diamines, it is possible, by suitable choice thereof, to adjust the hardening time during the shaping to any desired value. The more strongly basic is the diamine, the more rapidly does the cross-linking take place.

The cross-linked plastics provided by the present invention constitute most valuable elastomers. In accordance with the invention these elastomers are obtained from novel intermediates which are stable in storage. The fact that the cross-linking can be carried out at any desired subsequent time makes the novel intermediates of the invention highly suitable for use in the commercial production of elastomers.

What is claimed is:

1. In the preparation of a storable adduct adapted to be cured to form an elastomeric substantially non-porous polyurethane by reaction thereof with a polyisocyanate by a process which comprises reacting a polyester with an excess of an organic polyisocyanate and then with a compound having amino groups, the improvement which permits incorporation of the polyisocyanate to be used during the subsequent curing process in the adduct at the time the adduct is prepared which comprises (1) reacting a polyester having terminal hydroxyl groups, an hydroxyl number of from about 20 to about 80 and an acid number of about 1 with an excess of an aromatic diisocyanate sufficient to form an adduct having terminal —NCO groups but not more than about 0.25% by weight —NCO groups; said polyester having been selected from the class consisting of polyesters prepared by esterification of a dicarboxylic acid and an aliphatic glycol and a polyester prepared by esterification of a dicarboxylic acid with a mixture of an aliphatic glycol and a hydrogen-containing amine; (2) reacting the said adduct having terminal —NCO groups with an excess of an aromatic diprimary amine to form a product containing free —$NH_2$ groups, and (3) mixing the resulting product with from about 5% to about 15% by weight of a diisocyanate having a uretidinedione ring connecting two aromatic radicals and prepared by addition of only two mols of monomeric aromatic diisocyanate.

2. The process of claim 1 wherein the dimeric diisocyanate is the dimer of 2,4-tolylene diisocyanate.

3. The process of preparing a cured elastomeric polyurethane which comprises heating the product of claim 4 at a temperature above 80° C. whereby the uretidinedione ring of the dimeric diisocyanate opens and the resulting —NCO groups react with —$NH_2$ groups of the adduct.

4. A storage stable mixture of an organic polyisocyanate and the reaction product of a polyester, a diamine and an organic diisocyanate prepared by the process which comprises (1) reacting a polyester having terminal hydroxyl groups, an hydroxyl number of from about 20 to about 80 and an acid number of about 1 with an excess of an aromatic diisocyanate sufficient to form an adduct having terminal —NCO groups but not more than about 0.25% by weight NCO groups; said polyester having been selected from the class consisting of polyesters prepared by esterification of a dicarboxylic acid and an aliphatic glycol and a polyester prepared by esterification of a dicarboxylic acid with a mixture of an aliphatic glycol and a hydrogen-containing amine; (2) reacting the said adduct having terminal —NCO groups with an excess of an aromatic diamine to form a product containing free —NH$_2$ groups, and (3) mixing the resulting product with from about 5% to about 15% by weight of a diisocyanate having a uretidinedione ring connecting two aromatic radicals and prepared by addition of only two mols of monomeric aromatic diisocyanate.

5. The product of claim 4 wherein the said dimeric diisocyanate is a dimer of tolylene diisocyanate.

6. The product of claim 4 wherein the aromatic diamine is selected from the group consisting of 3,3-dichlorobenzidine and 1,5-naphthylene diamine.

References Cited in the file of this patent

UNITED STATES PATENTS

| | | |
|---|---|---|
| 2,621,166 | Schmidt | Dec. 9, 1952 |
| 2,625,531 | Seeger | Jan. 13, 1953 |
| 2,671,082 | Stallmann | Mar. 2, 1954 |
| 2,760,953 | Seeger | Aug. 28, 1956 |

OTHER REFERENCES

Lookwood: "Supplemental Report on Application of Diisocyanates," Fiat Final Report No. 1301, September 15, 1947.

UNITED STATES PATENT OFFICE
CERTIFICATE OF CORRECTION

Patent No. 3,099,642                              July 30, 1963

Hans Holtschmidt et al.

It is hereby certified that error appears in the above numbered patent requiring correction and that the said Letters Patent should read as corrected below.

Column 3, line 14, for "as" read -- is --; column 5, line 23, for "polyestesr" read -- polyesters --; line 48, for "base" read -- based --; same column 5, line 56, for "polyethers" read -- polyesters --; column 6, line 13, for "dissocyanate" read -- -- diisocyanate --.

Signed and sealed this 25th day of February 1964.

(SEAL)
Attest:
ERNEST W. SWIDER

Attesting Officer

EDWIN L. REYNOLDS

Acting Commissioner of Patents